United States Patent [19]
Knight et al.

[11] Patent Number: 5,787,019
[45] Date of Patent: Jul. 28, 1998

[54] SYSTEM AND METHOD FOR HANDLING DYNAMIC CHANGES IN DEVICE STATES

[75] Inventors: Holly Knight, La Honda; Milton Soong, San Jose; Pradeep Kathail, Santa Clara, all of Calif.

[73] Assignee: Apple Computer, Inc., Cupertino, Calif.

[21] Appl. No.: 644,255

[22] Filed: May 10, 1996

[51] Int. Cl.$^6$ .................................................. G06F 15/177
[52] U.S. Cl. .................. 364/550; 395/681; 364/DIG. 1; 364/264.6; 364/264.7
[58] Field of Search ........................... 395/681, 281–84, 395/828–24, 830–39; 364/550

[56] References Cited

U.S. PATENT DOCUMENTS

| | | | |
|---|---|---|---|
| 4,025,906 | 5/1977 | Riikonen | 395/836 |
| 4,794,525 | 12/1988 | Pickert et al. | 395/836 |
| 4,862,355 | 8/1989 | Newman et al. | 395/836 |
| 5,014,193 | 5/1991 | Garner et al. | 395/830 |
| 5,109,484 | 4/1992 | Hughes et al. | 395/836 |
| 5,265,241 | 11/1993 | Arnold et al. | 395/835 |
| 5,307,491 | 4/1994 | Feriozi et al. | 395/681 |
| 5,317,695 | 5/1994 | Celi, Jr. | 395/836 |
| 5,379,437 | 1/1995 | Celi, Jr. et al. | 395/651 |
| 5,408,669 | 4/1995 | Stewart et al. | 395/836 |
| 5,454,084 | 9/1995 | Uchikoga | 395/836 |
| 5,457,798 | 10/1995 | Alfredsson | 395/681 |
| 5,465,364 | 11/1995 | Lathrop et al. | 395/681 |
| 5,491,804 | 2/1996 | Heath et al. | 395/830 |
| 5,535,415 | 7/1996 | Kondou et al. | 395/835 |
| 5,537,663 | 7/1996 | Belmont et al. | 395/835 |
| 5,548,782 | 8/1996 | Michael et al. | 395/835 |
| 5,553,245 | 9/1996 | Su et al. | 395/836 |
| 5,555,510 | 9/1996 | Verseput et al. | 395/282 |
| 5,586,268 | 12/1996 | Chen et al. | 395/836 |
| 5,590,376 | 12/1996 | Kou | 395/835 |
| 5,613,123 | 3/1997 | Tsang et al. | 395/651 |
| 5,624,137 | 4/1997 | Merkin et al. | 395/830 |
| 5,625,841 | 4/1997 | Dawkins et al. | 395/835 |
| 5,628,027 | 5/1997 | Belmont | 395/830 |
| 5,630,174 | 5/1997 | Stone, III et al. | 395/836 |
| 5,634,074 | 5/1997 | Devon et al. | 395/830 |
| 5,671,441 | 9/1997 | Glassen et al. | 395/836 |

FOREIGN PATENT DOCUMENTS

| | | |
|---|---|---|
| 0590645 | 4/1994 | European Pat. Off. . |
| 0650120 | 4/1995 | European Pat. Off. . |
| WO9411812 | 5/1994 | WIPO . |

*Primary Examiner*—Lance Leonard Barry, Esq.
*Attorney, Agent, or Firm*—Carr & Ferrell LLP

[57] ABSTRACT

The present invention is a system and method by which changes in states of devices within a computer system are identified and understood by relevant parts of the system. The system responds to state changes in a well-defined and predictable way without requiring a reboot cycle of operation. The state changes can be classified as a "hard event" or a "soft event." Each event may further classified as, among others, a "device removed" event or a "device added" event.

18 Claims, 6 Drawing Sheets

SYSTEM AND METHOD FOR HANDLING DYNAMIC CHANGES IN DEVICE STATES

CROSS-REFERENCE TO RELATED APPLICATIONS

The present invention relates to U.S. patent application Ser. No. 08/435,677, entitled "Method And Apparatus For Handling I/O Requests," filed on May 5, 1995, and to U.S. patent application Ser. No. 08/435,676, entitled "Dynamic Device Matching Using Driver Candidate Lists," filed on May 5, 1995, U.S. Pat. No. 5,630,076 and to CIP U.S. patent application Ser. No. 08/648,305, entitled "Dynamic Device Matching Using Driver Candidate Lists," filed on May 2, 1996, and to U.S. patent application Ser. No. 08/644,702, entitled "System And Method For Logging And Enabling Further Manipulation Of System State Information," filed on May 10, 1996, and to U.S. patent application Ser. No. 08/644,259, entitled "System And Method For Canceling A Computer Request," filed on May 10, 1996, and to U.S. patent application Ser. No. 08/644,704, entitled "System And Method For Collecting And Dispatching Selected Events In A Computer Application Program," filed on May 10, 1996, and to U.S. patent application Ser. No. 08,644,705, entitled "System And Method For Arbitrating Access To Selected Computer System Devices," filed on May 10, 1996, which are incorporated herein by reference.

BACKGROUND OF THE INVENTION

1. Field of the Invention

The present invention relates generally to systems and methods for handling computer system changes, and more particularly for handling dynamic changes in device states within a computer system.

2. Background Art

Many prior art computer systems have supported "static" device Input/Output (I/O) architectures. As used herein, a physical "device" is a hardware device or its associated I/O bus. A bus may be "static" in that, while power is being applied, the working set of devices does not change. In operating systems using static device I/O architectures, the task of bus and device management is relatively simple: once, during startup, establish the known set of devices, which cannot change until the system is rebooted. One architecture that may be used in this manner is that of the PCI (Personal Computer Interconnect) bus and its associated devices.

For newly installed devices to operate properly, static architecture systems require an installation cycle of "Plug, Install Driver, Reboot, and Play." A change in the working set of devices between boot-ups may require system configuration files to be edited and/or motherboard jumpers to be set, in order for the devices to be recognized by the operating system (OS). Thus, users may need a high level of technical expertise in order to change peripheral devices. Further, the rebooting operation required for recognition of addition or removal of a device is typically time consuming and inconvenient.

Functionality to support changes in hardware configuration has been developed for some statically coded prior art operating systems and services, but this functionality does not operate in a consistent manner with the prior art OS and other services that may come into contact with the dynamic nature of the system configuration.

What is needed is an I/O architecture design that permits computer system devices to be changed "dynamically," that is, in a consistent and well-defined manner without requiring a system reboot.

SUMMARY OF THE INVENTION

The present invention provides a device notification system and method by which changes in states of devices within a computer system are identified and understood by relevant parts of the computer system. The invention identifies devices independently of their architecture and anticipates future implementation of "hot-swappable" devices (devices that may be inserted or removed without crashing the computer system) by creating new low-level software routines rather than by requiring replacement of an entire operating system. The device notification system responds in well-defined and predictable ways to state changes during boot-up or alternatively upon hot plugging/unplugging of devices during run time. In this environment service software modules known as families and plug-ins are loaded and unloaded as needed. If a device is added to the computer system, then the operating system loads the family and plug-in for the device. If later the device is removed, then the operating system unloads the plug-in for the device.

State changes may be classified as "hard" events or "soft" events, and events and may be further classified as "device removed" events or "device added" events.

The present invention provides software families, family programming interfaces, and plug-ins, which are implemented within a kernel-based multitasking operating system. Each software family provides a set of services, such as I/O services, for the system and its application programs. The family programming interface provides applications, other families, and system software access to the family's services performed by plug-ins. Plug-ins are dynamically loadable modules of software that control hardware devices that can be added to provide an instance of the service provided by a family, or removed.

The same mechanism according to the present invention is used to communicate the configuration change as a consistent message to the system. The system advantageously does not and the system frees up system resources when external devices are removed.

DETAILED DESCRIPTION OF THE PREFERRED EMBODIMENTS

The present invention provides a device notification system and method by which changes in states of devices within a computer system are recognized by relevant parts of the computer system. A state change is classified as a "hard event" or as a "soft event" and events may further classified as, for example, "device removed" events or "device added" events. The device notification system responds to state changes in well-defined and predictable ways without requiring a reboot cycle of operation.

Figure 1:
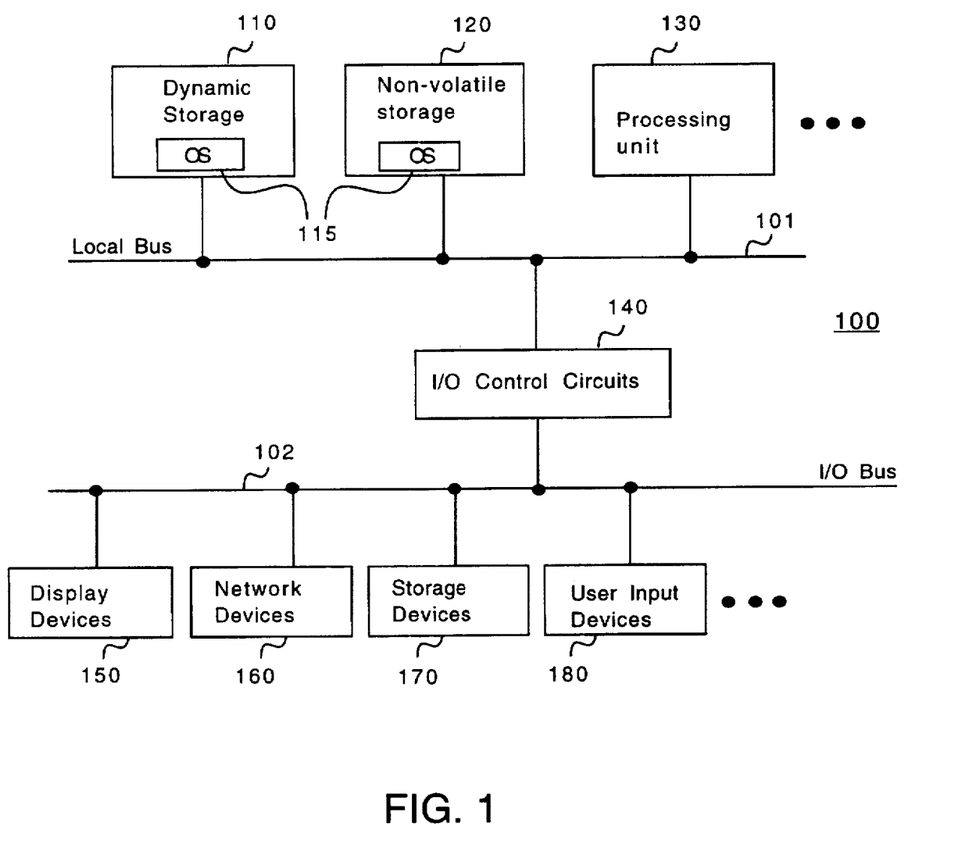
FIG. 1 is a block diagram of a computer system suitable for embodying the invention for dynamically handling device state changes.

FIG. 1 is a block diagram illustration of a computer system 100 suitable for embodying a device notification system for dynamically handling device state changes according to the present invention. System 100 includes preferably a Macintosh® (Apple Computer, Inc. of Cupertino, Calif.) personal computer using a PowerPC™ (Motorola Corporation, Schaumberg, Ill.) processing unit 130, dynamic (RAM) storage 110, and non-volatile (ROM) storage 120. Under control of an operating system 115, processing unit 130 accesses information stored in RAM 110 and in ROM 120 via local bus 101, which is a bi-directional signal bus for communicating control, address, and/or data information.

System 100 further includes display devices 150 such as CRT displays, network devices 160 such as an Ethernet LAN, storage devices 170 such as a disk drive and a PCMCIA (Personal Computer Memory Card International Association) card, and user input devices 180 such as a keyboard, mouse, stylus and/or input tablet. Each of these devices communicates information over a device-specific I/O bus 102. Each of I/O bus 102 and devices 150, 160, 170, and 180 constitutes a "device," a state change in which can be handled by the present invention. Information transfer between buses 101 and 102, and consequently between processing unit 130 and devices 150, 160, 170 and 180, is facilitated by I/O bus-specific control circuits 140.

Operating system software 115 and "drivers" (defined below) for performing certain system tasks are communicated from a user-supplied disk or device ROM and are stored in RAM 110, in storage device 170, or in a combination of these.

Figure 2:
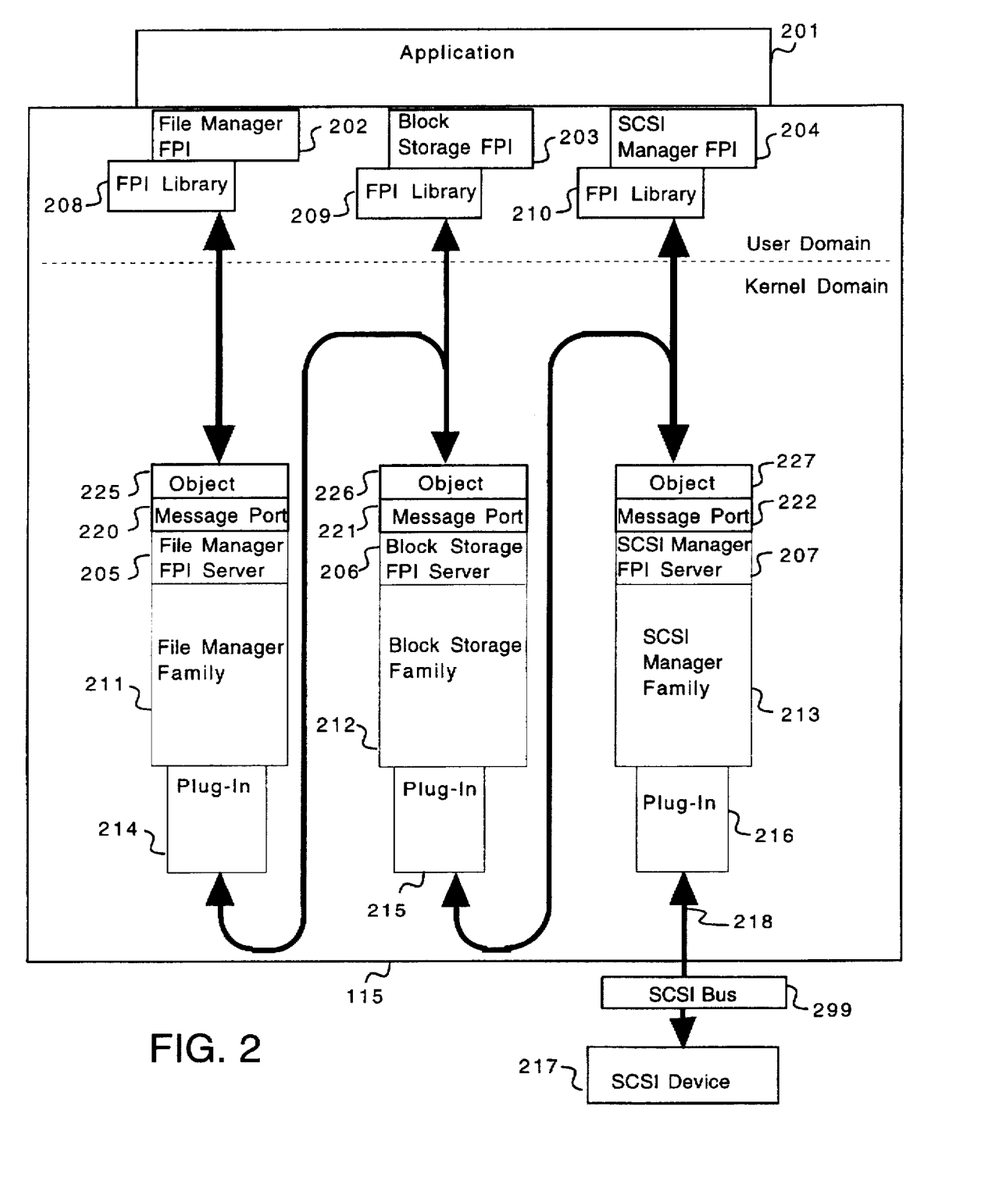
FIG. 2 is a block diagram representation of family interactions for dynamically handling device state changes.

Referring to FIG. 2, the operating system 115 is a kernel-based, pre-emptive, multitasking system which executes applications in a User domain and executes system services, such as I/O drivers, in a separate Kernel domain. Kernel domain programs have access to data of the User domain, but User domain programs do not have direct access to data of the kernel domain. Operating system 115 has many other components not relevant to the invention and not shown here. OS 115 may include for example, components of a kernel based operating system.

The invention uses one or more separate "families" operating in the kernel domain to provide services for the system and for applications. A family is a hardware-independent collection of software that is responsible for handling a specific class of I/O devices (i.e., SCSI, PCMCIA, etc.), whether physical devices or logical devices. Logical devices are software abstractions built on physical devices (i.e., a file system volume spanning a hard disk).

A "plug-in" is a dynamically loaded module of hardware-specific software for handling a specific physical device (hardware device, or bus.) or logical device. Plug-ins are so-named because architecturally they "plug" into a family. A plug-in provides a hardware-specific instance of the service offered by a family. For example, within the SCSI (Small Computer Systems Interface) family, a plug-in implements SCSI-specific services. Plug-ins can be a superset of device drivers, such that all drivers are plug-ins, but not all plug-ins are drivers. Plug-ins are isolated by families from the complexity of the operating system. Thus, the plug-in code can be simple, without the need to know or to be affected by the operating system.

There are high-level families and low-level families. Low-level families control physical devices that can be added to or removed from the computer system. High-level families control logical devices instantiated on physical devices that can be added or removed. The concept of a high-level "logical device" is needed since dynamic changes of an actual "physical device" are detected by a low-level family. Families that directly notice when a device is added or removed are "producer" families. Families that are interested in being informed of conditions discovered by other families are "consumer" families. A given family may be both a producer and a consumer.

A consumer that is interested in using a family of services first "subscribes" to the service by specifying what information category it belongs to ("ID," to be discussed with reference to FIG. 3), what event(s) it is interested in, and a port location where notification messages are to be delivered. The notification will be triggered by a call from a producer family. Upon noticing a device state change, a low-level family maps the change into an event and announces the event in the form of messages to the subscribed consumers, which may then respond to the event. One unique advantage of the device notification architecture is that the event producer does not have to know the identities of the consumers. Software dependency is reduced, resulting in a more robust operating system.

Each family defines a family programming interface (FPI) for providing applications, other families, and system software access to the family's services. Each FPI, illustrated as file manager FPI 202, block storage FPI 203, and SCSI manager FPI 204, has access to a respective FPI library 208–210 containing code which passes I/O service requests (or function calls) as messages to respective FPI servers 205–207. Typically, an FPI library maps FPI function calls into messages and sends the messages for servicing by an FPI server, which resides in the kernel domain.

Kernel messages are units of information interchange. The kernel provides the ability to control and prioritize the flow of information as it moves a message from the producer family to the consumer family. Preferably, the kernel does not examine or interpret the content of messages. Kernel messaging is preferably used between respective FPI libraries 208–210 and FPI servers 205–207 within a given family 211–213, between different families, and between plug-ins of one family and other families. When kernel messaging is used, FPI servers 205–207 support message ports for sending and receiving messages. Each family 211–213 has a respective administration message port (AMP) 220–222 through which messages are delivered to respective family servers 205–207. Message objects 225–227 are associated with respective AMP ports 220–222 and represent system resources such as a device driver or a file system.

One or more FPIs, 202–204 are used by application 201 to access SCSI device 217. Each FPI is available to one or more applications 201 in the user domain, and multiple FPIs may be available to a given application. Application 201 can request I/O service through file manager FPI 202, block storage FPI 203, and/or SCSI manager FPI 204, etc. Application 201 sends messages as desired to objects 225–227, and servers 205–207 receive messages from messages ports 220–222.

FIG. 2 shows three I/O families 211–213 communicating by kernel messages to complete a service request. Messages flow from the application level 201 through one family to another family, and so on. Message communication is facilitated using message object ID numbers, and message ID numbers. Message object ID numbers allow servers 205–207 to associate information about respective objects 225–227 with messages from application 201, and can be changed by the servers at any time. The message ID number is used by the FPI server 207 to notify application 201 when message processing is complete.

How an FPI server responds to a service request depends on the family's activation model, which provides the runtime environment of the family and its plug-in(s). For instance, the model may put a request in a queue or it may call a plug-in directly to service the request. Within the file manager family 211, a plug-in 214 implements file manager-specific services. The plug-in 214 understands how data is formatted in a particular file system, but it is preferably not the file manager family plug-in's responsibility to obtain data from a physical device. In order to obtain data from a physical device, file manager plug-in 214 communicates to, for instance, block storage family 212. In one embodiment, block storage plug-in 215 provides media specific drivers, such as hard disk drivers (plug-ins) that interface to a specific model of hard disk. Block storage plug-in 215 in turn may call SCSI manager FPI sever 207 to access data through a SCSI bus family plug-in 216 across a SCSI bus 299 from a SCSI device 217. In the FIG. 2 configuration, plug-in 214 is a logical device driver while plug-ins 215 and 216 are physical device drivers.

Figure 3:
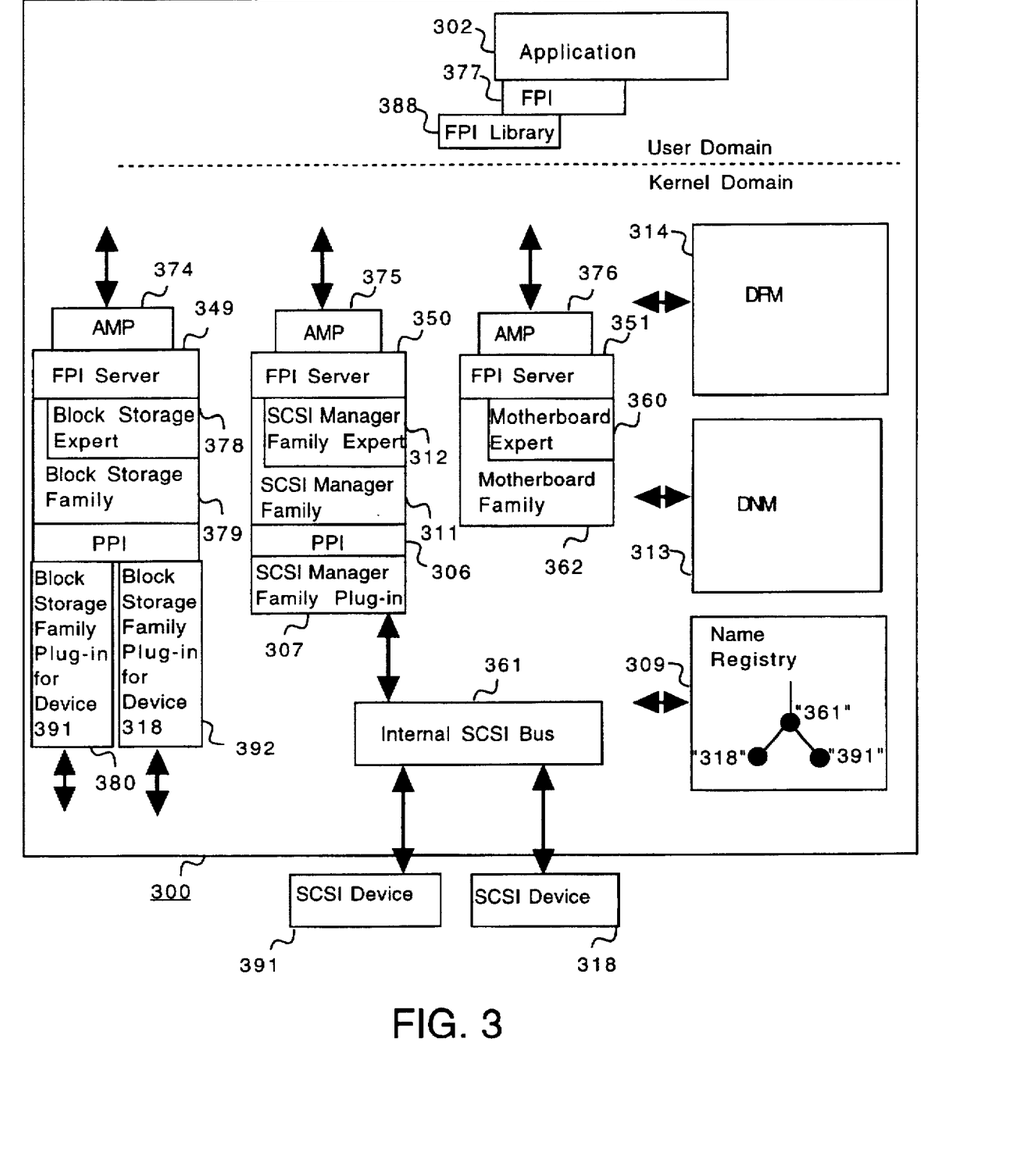
FIG. 3 is a block diagram representation of system interaction for dynamically handling "hard events"

FIG. 3 is a block diagram representation of system interaction for dynamically handling "hard events." A "hard event" includes a device state change (e.g., manually connecting or disconnecting a SCSI device) which typically cannot be delayed. The system for dynamically handling a SCSI device "hard event" can comprise a "machine-platform" 300. Machine-platform 300 preferably includes a processing unit 130 (e.g. Apple computer model 8100), application program 302, families 379, 311, and 362, driver and family matching service 314 (DFM), device notification manager 313 (DNM), name registry 309, and internal SCSI bus 361.

On boot-up, driver and family matching service (DFM) 314 identifies the particular machine-platform 300 by its "ID." An ID identifies a device to the system and may be generated by the device using software or hardware. DFM 314 uses IDs to match physical and logical devices to plug-ins, families, and associated services. DFM 314 then loads motherboard family 362 and the corresponding motherboard expert 360. Motherboard expert 360 is aware of the connections of physical devices within the machine-platform 300. Motherboard expert 360 detects a hardwired connection of an internal SCSI bus 361, which is also identified by an ID that motherboard expert 360 communicates through DNM 313 to the system. In the process of notifying the system, DNM 313 talks to DFM 314. DFM 314 matches the internal SCSI bus 361 ID to SCSI manager family plug-in 307, and returns the result to DNM 313. DNM 313 looks up subscribers through, and sends notification messages to subscribers through, AMPs 374–376. DFM 314 notifies DNM 313 of the match between internal SCSI bus 361 and SCSI manager family plug-in 307, which causes DNM 313 to invoke the DFM 314 to instantiate the SCSI manager family plug-in 307 ID with SCSI manager family 311 by loading SCSI manager family 311 and associated services, including SCSI manager family expert 312, AMP 375, PPI 306, and FPI server 350. SCSI manager family 311 (and other families, not shown) communicates between the kernel domain and the user domain as discussed with reference to FIG. 2. An application 302 may communicate with a device 318 by submitting a service request through an FPI 377 to an FPI library 388 containing code which passes requests from application 302 as kernel messages to AMP(s) 374–376 of FPI servers 349–351. FPI servers 349–351 respond to client families' (e.g., applications, other families) service requests according to the activation model of the servers' respective families.

In the exemplary embodiment, motherboard expert 360 populates a node of name registry 309 with the internal SCSI bus 361 node ID (a record labeled "361"). The name registry 309 may create a device sub-tree which describes the I/O architecture of the system in terms of the configuration and connections of the system hardware, to identify a plug-in and its associated device (i.e., internal SCSI bus and SCSI family plug-in).

On an ongoing basis through changes in system configurations, the consumer families are notified, as described below, about plug-ins known to and available through the producer families.

Plug-in programming interface (PPI) 306 provides a SCSI manager family 311-to-plug-in 307 interface which defines the entry points that plug-in 307 must support so that it can be added or removed, and provides a plug-in-to-family interface which defines routines that plug-in 307 must call when certain events, such as the addition of a device, occur. In addition, PPI 306 defines the path through which consumers (high-level families) and low level SCSI family plug-in 307 exchange data. The consumers for SCSI family 311 are usually high-level families. Thus, low-level families insulate high-level families from knowledge of the physical connectivity of devices.

In the exemplary embodiment, SCSI family manager expert 312 (once installed) probes for newly inserted SCSI devices (i.e., SCSI devices 318 and/or 391), and if a device is connected, senses and communicates the device ID to DFM 314 for matching with any subscribed consumers (i.e., block storage family plug-in(s) 380 and/or 392). If the name registry 309 device tree does not contain ID nodes for device 318 and/or 391, SCSI manager family expert 312 creates ID nodes (labeled "318" and "391") under the internal SCSI bus 361 node (labeled "361"). SCSI family expert 312 determines which category the ID node belongs to and uses device notification manager (DNM) 313 to inform block storage consumer family 379 because it is subscribed to the class of devices comprising internal SCSI bus device 361.

No matter what technique is used by a given low-level family to scan for and discover new devices, the same mechanism according to the present invention is used to communicate any configuration change as a consistent message to the system. Thus, a low-level family plug-in (SCSI manager family plug-in 307) does not need to know which device (391 and/or 318) belongs to which high-level family (block storage family 379).

DNM 313 communicates with consumers through AMP ports 374–376 as discussed with reference to FIG. 2. In this manner, DNM 313 invokes driver and family matching service (DFM) 314 to match appropriate plug-ins 307, 380, and 392 with appropriate subscribed family(s) each time a plug-in of its family type is discovered. However, actual instantiation of plug-in(s), such as 380 and/or 392 in high-level families (block storage family 379) is performed by the associated high-level family expert (block storage expert 378), which creates "logical device" node(s) for device(s) 318 and/or 391 IDs under its sub-tree, in name registry 309, for storing device 318 and/or 391 specific information. Block storage plug-ins 380 and 392 can then use the name registry 309 information for I/O communication with SCSI FPI server 350 (or other subscribed consumers).

In an analogous manner, the dynamic removal of a SCSI device (i.e. 318) from system 300 is first detected by SCSI manager family expert 312. SCSI manager family expert 312 communicates removal from the system 300, of a SCSI device ID ("318"), through DNM 313, to the AMP (374) of any subscribed high-level families (i.e., block storage family expert 378, SCSI family expert 312). Block storage family expert 378 allows any outstanding block storage family I/O processes to finish, before communicating back through DNM 313 to remove the "logical device" name registry node "318" (and thus the associated plug-in) of the removed device. If a high-level family encounters a problem with finishing an I/O process, the computer system user will be alerted. A second SCSI device 391 removal "hard-event" would also be identified by SCSI family expert 312, and communicated through DNM 313 to remove name registry node "391." Name registry node "361," representing internal SCSI bus 361, will not be removed since device 361 is still resident in system 300.

Figure 4:
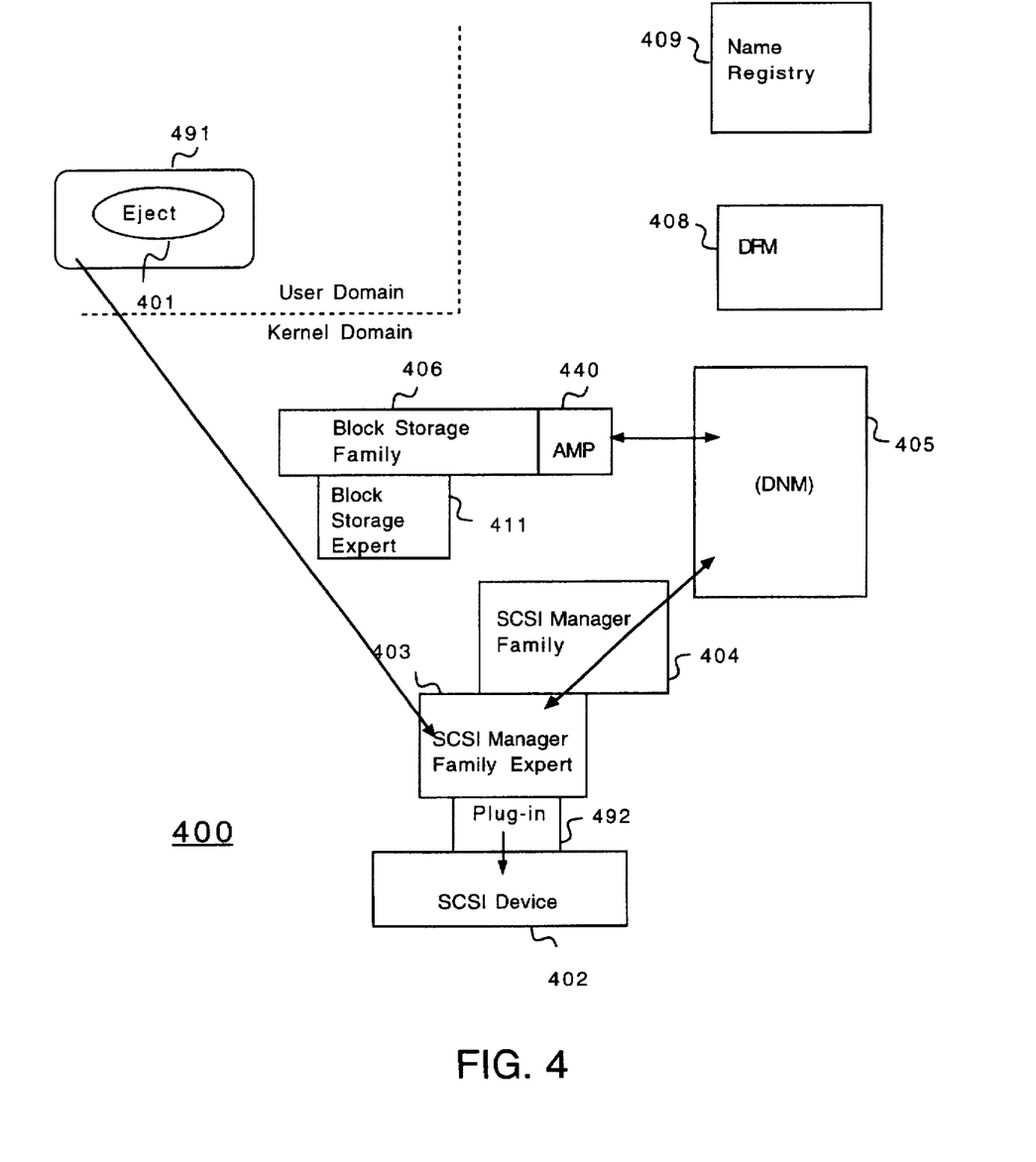
FIG. 4 is a block diagram representation of system interaction for dynamically handling "soft events"

FIG. 4 is a block diagram representation of system interaction for dynamically handling "soft events," which may occur when a computer system 100 user communicates a request (e.g., pressing a device 402 eject button 401 from an application program 491 pop-up menu) to SCSI manager family expert 403, to remove SCSI device 402 from the system. The request is communicated by SCSI manager 404 SCSI family expert 403 through DNM 405 to block storage family AMP 440. Block storage expert 411 preferably responds by sending: "proceed with event," "delay the event," or "don't proceed with event" status signals back through DNM 405 to SCSI manager family 404.

Block storage family 406 communicates "Delay the event" through DNM 405, to SCSI manager family 404, until all device 402-required tasks (e.g. cache needs to be flushed) are completed by block storage family 406. If block storage family 406 determines that SCSI device 402 cannot be removed from the computer system, it communicates status signals through DNM 405 to SCSI manager family 404 as "don't proceed with event," in response to which SCSI manager family 404 communicates, through DNM 405, an "event canceled" status signal back to block storage family 406.

Alternatively, proper completion of the tasks required to finish servicing device 402, by block storage family 406 and other subscribed high-level families (not shown), results in communication through DNM 405 of "proceed with event" to SCSI manager family 404. In response, SCSI manager family 404 communicates, through DNM 505, back to block storage family 406, "device removed." If no other SCSI devices 402 are detected by SCSI manager family expert 403, block storage family services are unloaded from the system 400. A "device removed" status may result in device 402 being physically ejected (i.e., under hardware control of SCSI manager family plug-in 492).

While the exemplary embodiment has been described in terms of device added and/or removed "events," those skilled in the art will recognize that other events can be handled by the present invention. Such events include: boot complete, I/O system complete, new plug-in in the file system, and re-map physical address events.

In a boot complete event, a motherboard hardware plug-in informs the system that all motherboard devices are loaded and running.

In an I/O system complete event, the DFM informs the computer system that the entire I/O system is ready for use.

In a new plug-in in file system event, a event is generated when a user copies a new version of a device driver on to a hard-disk. The I/O system can automatically replace the driver (plug-in) if it is a "better" version than the one currently in use. Thus, device drivers can be "hot pluggable" in the same manner as hardware devices.

In a re-map physical address event, a PCI bus architecture can support dynamic re-mapping of physical addresses for devices residing on the PCI bus. When a new device is added to the computer system, the existing address mapping may have to change. This event tells the system that all effected system devices must re-map their physical addresses.

Thus, the device notification service is flexible enough that other system wide events may be added as more features are needed.

Figure 5:
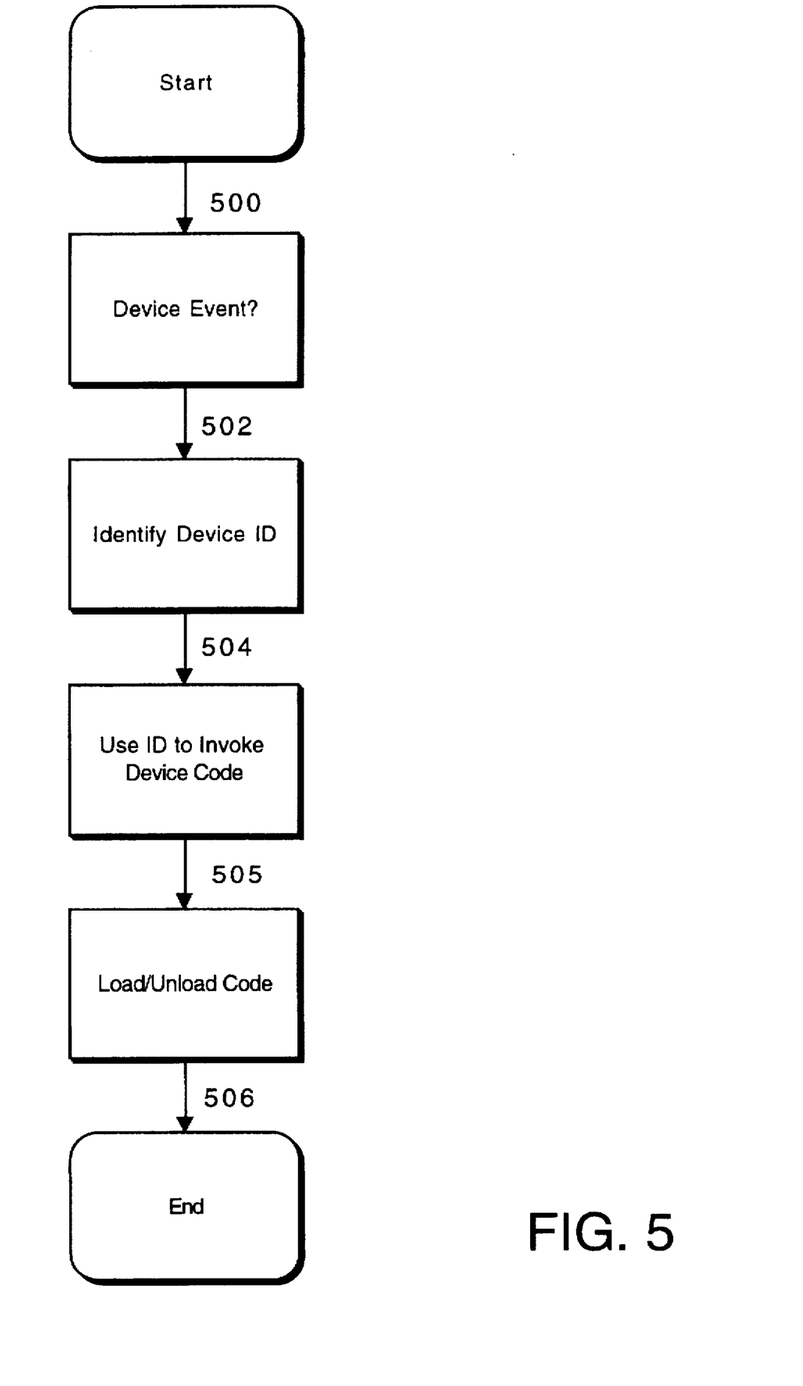
FIG. 5 is a flowchart of a preferred method for dynamically handling device state changes.

FIG. 5 is a flowchart of a preferred method for dynamically handling device state changes, starting in step 500 a device event occurs within the system. In step 502 the presence or absence of a device ID is identified by the system (i.e., family expert software). In step 504 the ID is used to invoke (using DFM and DNM and name registry services) device specific code (i.e., plug-in). Based on the event type in step 502 the code is loaded and run or unloaded in step 505.

Figure 6:
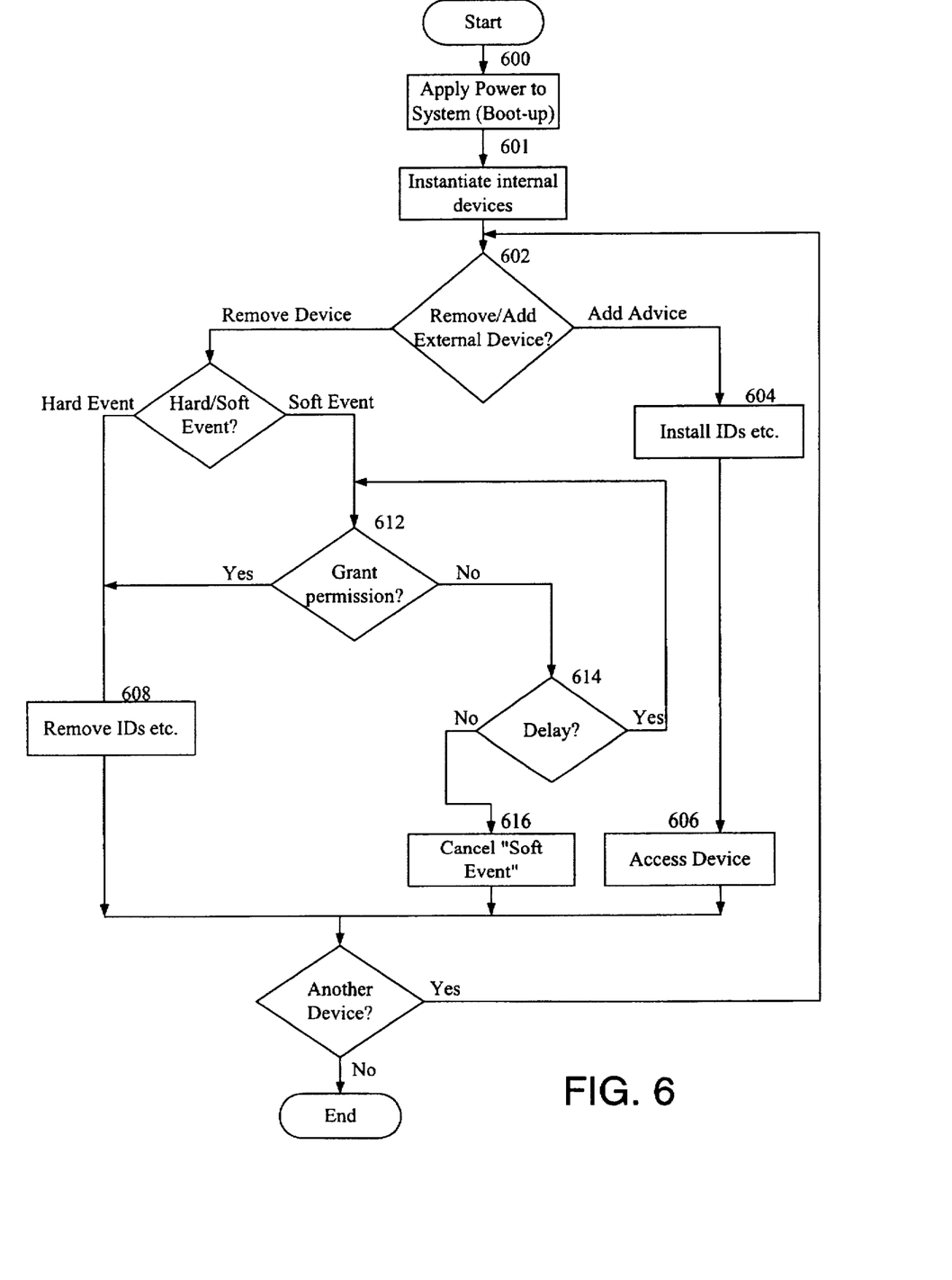
FIG. 6 is a flowchart of a preferred method for dynamically handling device state changes.

FIG. 6 is a flowchart of a preferred method for dynamically handling device state changes, starting in step 600 with application of power for system boot-up. In step 601 internal devices are identified and their plug-ins are instantiated by the system. In step 602 (after boot-up) a possible dynamic addition or removal of an external device is detected by the system. If a device has been dynamically added, the system in step 604 installs appropriate software (i.e., plug-ins) for access (using the DNM notification mechanism as previously discussed with reference to FIG. 3) in step 606 to the device. Alternatively, in step 607 dynamic device removal is detected as a "hard" or "soft" event. A "hard event" results in the system removing the device ID from a name registry and uninstalling the plug-in software associated with the device (using the DNM notification mechanism as previously discussed with reference to FIG. 3) in step 608. In contrast, a "soft event" in step 607 asks for permission to be granted by the system in step 612. If permission is granted, the system in step 608 un-installs the software associated with the device. If in step 612 permission is not granted, the system waits for permission in step 614. If permission is denied the soft event" is canceled in step 616. After any of the steps 608, 616 or 606, the preferred method returns to step 602.

Thus, no matter what technique is used by the present invention to scan and discover new devices, the same mechanism according to the present invention is used to communicate the configuration change as a consistent message to the system. The system advantageously does not and the system frees up system resources when external devices are removed.

Whereas many alterations and modifications of the present invention will no doubt become apparent to a person of ordinary skill in the art after reading the foregoing description, it is understood that the particular embodiment shown and described by way of illustration are in no way to be considered limiting. Therefore, it should be appreciated that the present invention should be construed as limited only by the claims.

What is claimed is:

1. A method for handling dynamic changes in states of physical input/output devices in a computer system, comprising the steps of:

establishing a plurality of families of software, each family being executable by the computer system and providing access to a predetermined class of input/output devices;

establishing subscriptions for predetermined ones of said families with predetermined other ones of said families, whereby said predetermined ones of said families receive notification of changes in states of the input/output devices from said predetermined other ones of said families;

detecting a change in state of an input/output device by a respective family; and notifying said predetermined ones of said families having subscriptions with said respective family of the change in state of the input/output device.

2. The method of claim 1, wherein said notifying step comprises the steps of:

mapping said change in state to an event message; and sending said event message to said predetermined ones of said families having subscriptions with said respective family.

3. The method of claim 1, further comprising the steps of:

detecting a dynamically installed input/output device;

identifying a class of input/output devices of which said dynamically installed input/output device is a member; and notifying families which have subscriptions to said class, of installation of said dynamically installed input/output device.

4. The method of claim 1, further comprising the steps of:

detecting a dynamically removed input/output device;

identifying a class of input/output devices to which said dynamically removed input/output device is a member; and notifying families which have subscriptions to said class, of removal of said dynamically removed input/output device.

5. The method of claim 3, further comprising the steps of:

establishing high-level families to control logical input/output devices instantiated on the physical input/output devices; and establishing low-level families to control the physical input/output devices and detect changes in the states of the physical input/output devices.

6. A system for handling dynamic changes in states of physical input/output devices in a computer system, comprising:

means for establishing a plurality of families of software, each family being executable by the computer system and providing access to a predetermined class of input/output devices;

means for establishing subscriptions for predetermined ones of said families with predetermined other ones of said families, whereby said predetermined ones of said families receive notification of changes in states of the input/output devices from said predetermined other ones of said families;

means for detecting a change in state of an input/output device by a respective family; and means for notifying said predetermined ones of said families having subscriptions with said respective family of the change in state of the input/output device.

7. The system of claim 6, wherein said means for notifying comprises:

mean for mapping said change in state to an event message; and means for sending said event message to said predetermined ones of said families having subscriptions with said respective family.

8. The system of claim 6, further comprising:

means for detecting a dynamically installed input/output device;

means for identifying a class of input/output devices of which said dynamically installed input/output device is a member; and means for notifying families which have subscriptions to said class, of installation of said dynamically installed input/output device.

9. The system of claim 8, further comprising:

means for establishing high-level families to control logical input/output devices instantiated on the physical input/output devices; and means for establishing low-level families to control the physical input/output devices and detect changes in the states of the physical input/output devices.

10. The system of claim 6, further comprising:

means for detecting a dynamically removed input/output device;

means for identifying a class of input/output devices to which said dynamically removed input/output device is a member; and means for notifying families which have subscriptions to said class, of removal of said dynamically removed input/output device.

11. A computer-readable medium comprising program instructions for causing a computer system to handle dynamic changes in states of physical input/output devices by performing the steps of:

establishing a plurality of families of software, each family being executable by the computer system and providing access to a predetermined class of input/output devices;

establishing subscriptions for predetermined ones of said families with predetermined other ones of said families, whereby said predetermined ones of said families receive notification of changes in states of the input/output devices from said predetermined other ones of said families;

detecting a change in state of an input/output device by a respective family; and notifying said predetermined ones of said families having subscriptions with said respective family of the change in state of the input/output device.

12. The computer readable medium of claim 11, wherein said notifying step comprises the steps of:

mapping said change in state to an event message; and sending said event message to said predetermined ones of said families having subscriptions with said respective family.

13. The computer readable medium of claim 11, further comprising program instructions for causing the computer system to perform the steps of:

detecting a dynamically installed input/output device;

identifying a class of input/output devices of which said dynamically installed input/output device is a member; and notifying families which have subscriptions to said class, of installation of said dynamically installed input/output device.

14. The computer readable medium of claim 13, further comprising program instructions for causing the computer system to perform the steps of:

establishing high-level families to control logical input/ output devices instantiated on the physical input/output devices; and establishing low-level families to control the physical input/output devices and detect changes in the states of the physical input/output devices.

15. The computer readable medium of claim 11, further comprising program instructions for causing the computer system to perform the steps of:

detecting a dynamically removed input/output device;

identifying a class of input/output devices to which said dynamically removed input/output device is a member; and notifying families which have subscriptions to said class, of removal of said dynamically removed input/output device.

16. A device notification system for notifying a computer system in response to a change in a connection state of a device, the device notification system comprising:

high-level family program code stored in a memory;

low-level family program code stored in a memory, the low-level family program code being configured to issue notification signals responsive to the change in the connection state, the notification signals including a code uniquely identifying the device for which the change in the connection state has been detected;

device notification program code stored in a memory, the device notification program code being configured to communicate the change in the connection state to the high-level family program code;

a first part of the high-level family program code being configured to use the device notification program code to communicate with a second part of the high-level family program code; and plug-in program code for enabling communication between the low-level family program code and the device in response to the change in the connection state of the device.

17. The device notification system of claim 16, wherein the low-level family program code unloads the plug-in program code responsive to the change in the connection state of the device.

18. The device notification system of claim 16, wherein the low-level family program code functions independently of the high-level family program code.

* * * * *